(No Model.)
M. W. DEWEY.
METHOD OF UTILIZING NATURAL ELECTRIC ENERGY.
No. 414,943.            Patented Nov. 12, 1889.
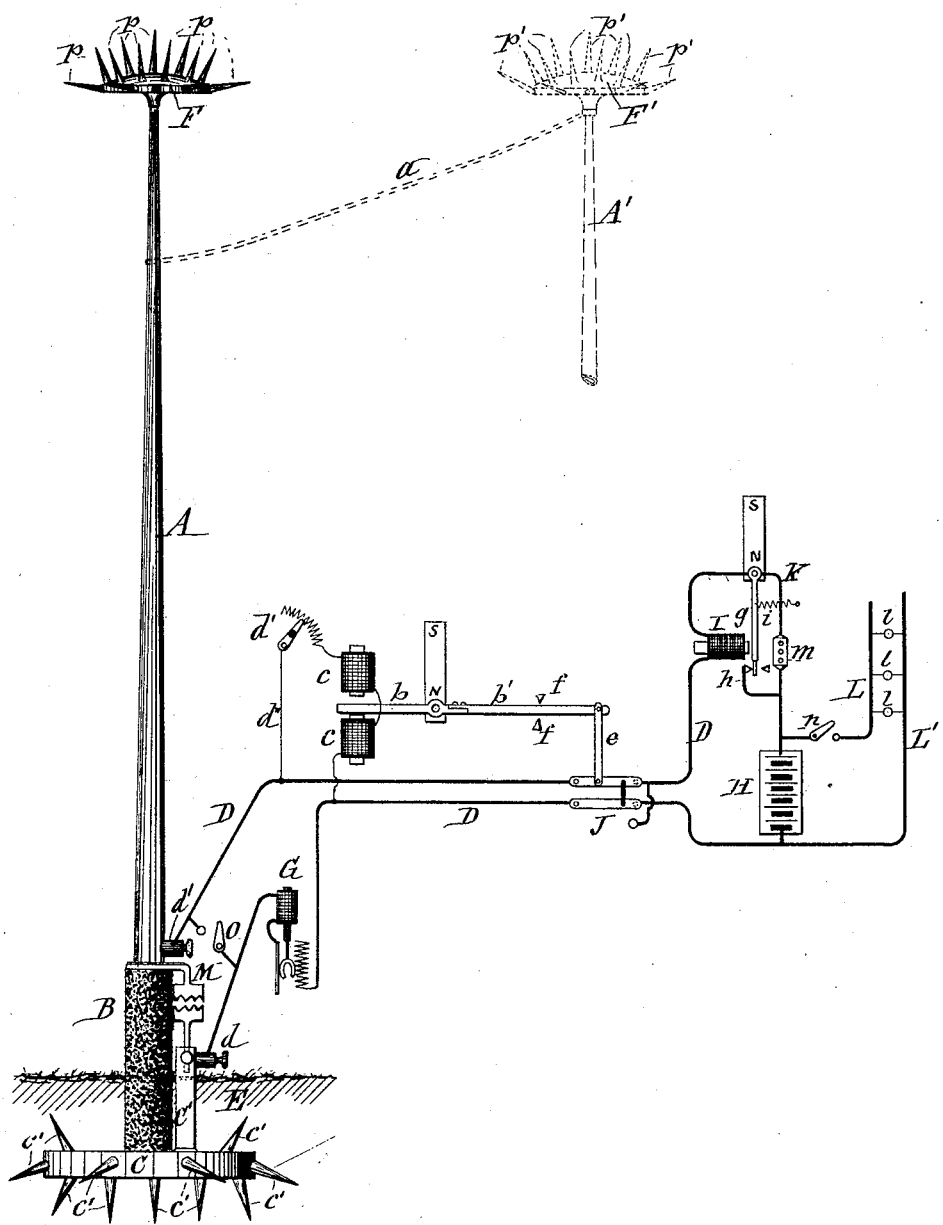
WITNESSES:
C. L. Bendixon
A. F. Walz
INVENTOR
Mark W. Dewey
BY
Dull, Laass & Dull
ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

METHOD OF UTILIZING NATURAL ELECTRIC ENERGY.

SPECIFICATION forming part of Letters Patent No. 414,943, dated November 12, 1889.

Application filed May 1, 1889. Serial No. 309,171. (No model.)

*To all whom it may concern:*

Be it known that I, MARK W. DEWEY, of Syracuse, in the county of Onondaga, in the State of New York, have invented new and useful Improvements in the Method of Utilizing Natural Electric Energy, of which the following, taken in connection with the accompanying drawings, is a full, clear, and exact description.

The object of this invention is to provide a method whereby natural electrical energy—such as the so-called "atmospheric electrical energy," or electrical energy that may be derived from the difference of potential existing between two points, one being the earth and the other the atmosphere at an elevation above the earth—may be collected or utilized for the various uses to which electricity is applied.

It has been found that the presence of electricity in the upper regions of the atmosphere is not confined to thunder-clouds, but can be detected at all times and often in great quantities in different conditions of the atmosphere. In fine weather this electricity is mostly positive; but in showery or stormy weather negative electricity is as frequently met with as positive, and it is in such weather that the indications of electricity, whether positive or negative, are usually the strongest. It has also been found that as we proceed farther from the earth's surface, whether upward from a level plane thereof or horizontally from an elevation, the potential of points in the air becomes more and more different from that of the earth, the difference being, in a broad sense, simply proportional to the distance; hence we can infer that there is electricity residing on the surface of the earth, the density of which at any moment in the locality of observation is measured by the difference of potential found to exist between the earth and a given point in the air near it. The results of observations show that the variations of the electricity residing in the atmosphere is the main cause of the variations of the electricity on the surface of the earth. A charged cloud or body of air induces electricity of the opposite kind to its own on the parts of the earth's surface over which it passes and produces such variations. The difference of potential in increasing the distance from the earth is due to electricity induced on the surface of the earth by opposite electricity in the air overhead, and the air being a non-conductor the electricities are unable to combine. As electrical density is greater on projecting parts of a surface than on those which are plane or concave, stronger indications are obtained on hills than in valleys, if the collecting apparatus be at the same distance from the ground in both cases. The average difference of potential is greater in the winter than in the summer. Little or no effects can be obtained within inclosures or under trees, as they tend to screen the apparatus.

Inasmuch as electricity travels in preference through the best conductors, it follows that if a path of low resistance is formed (such as the erection of a metal pole) to a sufficient elevation above the earth the electricities in the atmosphere and that on the surface of the earth will tend to combine and travel through the said path in a current or currents, and if this pole terminates in a metal point or a number of such points the earth and clouds exchange their opposite electricities without a disruptive discharge—as the lightning—but in a slow and gradual way through convection. Besides supplying the top of the pole with points, a metal plate to which the said points are fixed attracts the opposite electricity in the atmosphere. In order to obtain a greater and increased effect, a large metal plate is buried at the foot of the pole and electrically connected therewith, and is provided with points or branches extending in different directions in the ground. The plate and branches may be surrounded by metallic refuse, coke, or other good conducting substance. The metallic points on the top of the pole should be sharp, and preferably of copper, and may be platinized, gilded, or galvanized to prevent corrosion. It having been ascertained by practical experiments that either a flame or dropping water at an elevation above the surface of the earth produces convection of electricity, it is obvious that such means may be employed in place of the points hereinbefore referred to. As the electricity in the atmosphere is sometimes positive and other times negative, the direction of the currents is not always the same—that is, the atmospheric electrical energy is composed of a current of an alternating character, flowing in one direction on an average about as much of the time as in the opposite direction, but the length of the current in a certain direction, or the lengths of time between reversals or changes in the direction of its flow, is greatly varied. This and also the varied strength of the currents have prevented the utilization of atmospheric electrical energy in commercial quantities for the various purposes for which electricity is generally employed. In order to utilize such a current or currents, they should be transformed into a continuous direct current of uniform strength. The apparatus for accomplishing the transformation of atmospheric electricity into a direct current of uniform strength is susceptible of being greatly modified. The preferred form of apparatus, however, for carrying the invention practically into effect I will now proceed to describe to show that the method is capable of actual performance. Said apparatus is illustrated in the diagram accompanying this specification.

Referring specifically to said diagram, A represents a metallic pole, which is shown bare, but may be enveloped in suitable insulating material, if desirable. B is the base of the aforesaid pole, which base is of insulating material set in the ground E. C is a large metal plate beneath the said base, and has points or branches $c'$ extending therefrom in different directions in the ground. C' is a metallic post extending from the said plate above the surface of the ground and having a terminal $d$ of the circuit D. On the top of said pole is mounted a metallic cap F, consisting, preferably, of a convex disk provided with sharp iron or copper points $p$, which project in all directions from the same. As before mentioned, the said points may be plated with a suitable metal that forms a good conductor and prevents corrosion. Similar caps F' may be placed on other insulated poles, as A', in the vicinity, and connected with the main pole A by an electric conductor $a$, for increasing the effect. The pole A' may be of wood, and the pole A may also be of the same material if provided with a metal conductor within or on the outside, extending from the cap to the other terminal $d'$ of the circuit D. The said circuit D leads from the terminal $d$ through an automatic variable resistance G, thence to one of the poles of a secondary or storage battery H, and from the other pole of said battery through an automatic current-regulator to the terminal $d'$. An automatic current-reverser or pole-changer J is located in the said circuit for reversing the current whenever there is a change in its direction, so that it may be rectified or straightened during transit and caused to travel at all times whether its direction is toward or from the earth in one and the same direction through a portion of the circuit containing the secondary battery. The reversals are accomplished automatically by means of a pivoted polarized armature $b$, located between two electro-magnets $c\ c$, having their coils included in a shunt-circuit between the leads of the circuit D. The magnets are wound so that a north pole will be presented to the armature on one side and a south pole on the other. When the current is flowing in a certain direction, the said polarized armature will be repelled by one magnet and attracted by the other, and thereby moved to one side. When the current changes its direction through the magnets, the poles of the said magnets are reversed and the armature is both repelled and attracted to the other side. An arm $b'$, of diamagnetic material, is fixed to and extends from the armature and is moved by the same. Between a movable end of the arm and the said current-reverser is a pivoted connection or link $e$, by which the motion of the arm is conveyed to the reverser. Stops $f$ are provided for limiting the movement of the said arm, and an adjustable resistance $d'$ is included in the shunt $d''$ to regulate the current through the same.

The current-regulator hereinbefore referred to prevents short-circuiting or the rapid discharge of the secondary battery into the air and ground when the strength of said battery-current becomes greater than that passing to the battery. Said regulator is composed of an electro-magnet I, having its coil in the circuit D. A pivoted polarized armature $g$ is connected at its pivot to one terminal of the coil of said magnet, and when the current is flowing to the battery said armature is attracted by the magnet I and held in contact with the stop $h$, to which the terminal of the secondary battery is connected. In the aforesaid condition a free or low-resistance path for the current is provided to the battery; but when the battery-current exceeds the charging-current the magnet-poles are reversed and the armature is repelled by the magnet, and the free path of the circuit is broken between the armature $g$ and stop $h$. In order to maintain the armature in the latter position until the charging-current has been increased in strength above that of the battery-current or discharging-current, and so that the said regulator will automatically operate, a shunt path K of high resistance is provided around the armature $g$ and stop $h$. The high resistance of the said shunt is obtained by including a rheostat $m$. This shunt path or circuit K, with the resistance, permits a small but sufficient amount of current to flow through the magnet I to hold the armature away from the stop $h$ until the current is reversed, and then move the armature back to stop $h$ to close the free or low-resistance path. A spring $i$ is provided to assist the movement of the armature from the magnet when it is repelled by the same.

The electric current may be directly conducted to translating devices—such as lamps or electromotors; but, as hereinbefore stated, said current is preferably employed to charge one or more cells of the secondary battery H, and this battery stores or accumulates the electrical energy and supplies the said translating devices. To illustrate the latter feature, leads or wires L and L' are extended from the poles or electrodes of said battery, and translating devices, in the shape of incandescent lamps $l$, are connected with the said wires in multiple arc. In the wire L is a common circuit maker and breaker $n$ to close and open the circuit to the lamps. The said battery may be charged in series or parallel.

The automatic variable resistance G maintains the current flowing through the circuit D approximately uniform by increasing the resistance therein upon an increase of strength. Said resistance is not absolutely necessary and may be dispensed with.

The lightning-arrester M is to short-circuit a very heavy current to prevent the same from passing through the other parts of the apparatus and injuring it. A low-resistance shunt O, with a circuit maker and breaker therein, is connected between the leads of the circuit D, near the terminals $d$ and $d'$, to completely short-circuit the apparatus when desired.

Having described my invention, what I claim as new, and desire to secure by Letters Patent, is—

1. The method of utilizing atmospheric electrical energy, consisting in conducting the electric current or currents between the earth and a point in the atmosphere at an elevation above the earth, rectifying or straightening the currents during transit, and storing or accumulating the electrical energy of said rectified current or currents.

2. As preliminary steps in the method of utilizing atmospheric electrical energy, conducting the electric current or currents through a path of low resistance between the earth and the atmosphere at an elevation above the earth, maintaining an approximately uniform strength of current and rectifying or straightening the same during transit.

3. As preliminary steps in the method of utilizing atmospheric electrical energy, conducting the electric current or currents through a path of low resistance between the earth and the atmosphere at an elevation above the earth, and rectifying or straightening said currents during transit.

4. The method of utilizing atmospheric electrical energy or deriving energy from the difference of electrical potential existing between the earth and a point or points in the atmosphere at an elevation above the earth, consisting in conducting the current or currents between the two points through a path of low resistance, rectifying or straightening the said currents in a portion of the path during transit, and storing or accumulating the electrical energy thereof.

5. The method of utilizing atmospheric electrical energy or deriving energy from the difference of electrical potential existing between the earth and a point or points in the atmosphere at an elevation above the earth, consisting in conducting the current or currents between the two points through a path of low resistance, maintaining an approximately uniform strength of current, rectifying or straightening the said currents in a portion of the path during transit, and storing or accumulating the electrical energy.

6. The method of utilizing atmospheric electrical energy composed of a current of a varied alternating character, consisting in conducting the electric current or currents through a path of low resistance between the earth and the atmosphere at an elevation above the earth, and then accumulating the electrical energy of said current or currents while flowing in both directions in one or more cells of a secondary or storage battery, as described.

In testimony whereof I have hereunto signed my name this 29th day of April, 1889.

MARK W. DEWEY. [L. S.]

Witnesses:
C. H. DUELL,
C. L. BENDIXON.